March 16, 1965 A. GITTLER ETAL 3,173,536
REEL FOR MOTION PICTURE FILM AND THE LIKE
Filed March 20, 1963 2 Sheets-Sheet 1
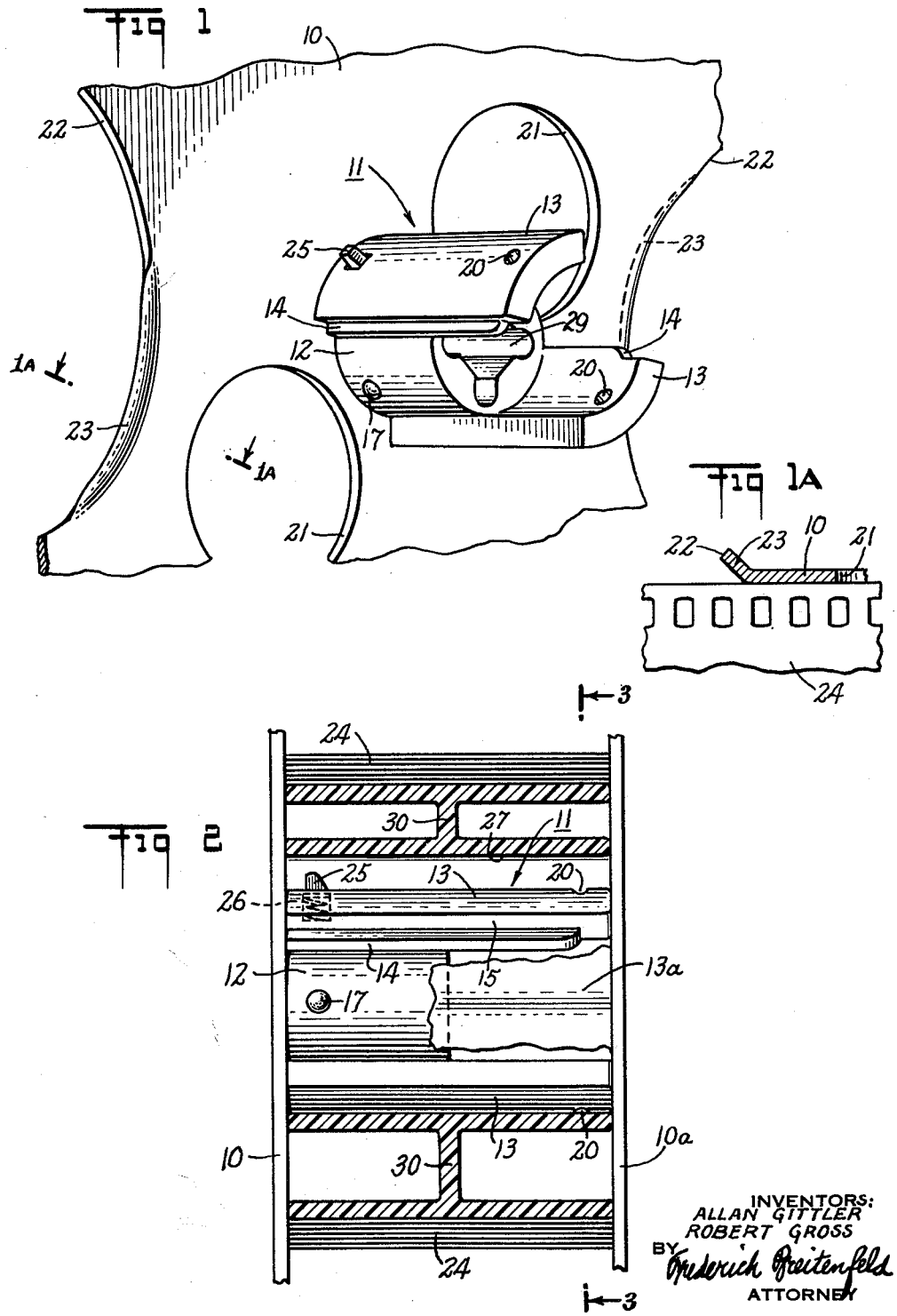
INVENTORS:
ALLAN GITTLER
ROBERT GROSS
BY Frederich Breitenfeld
ATTORNEY

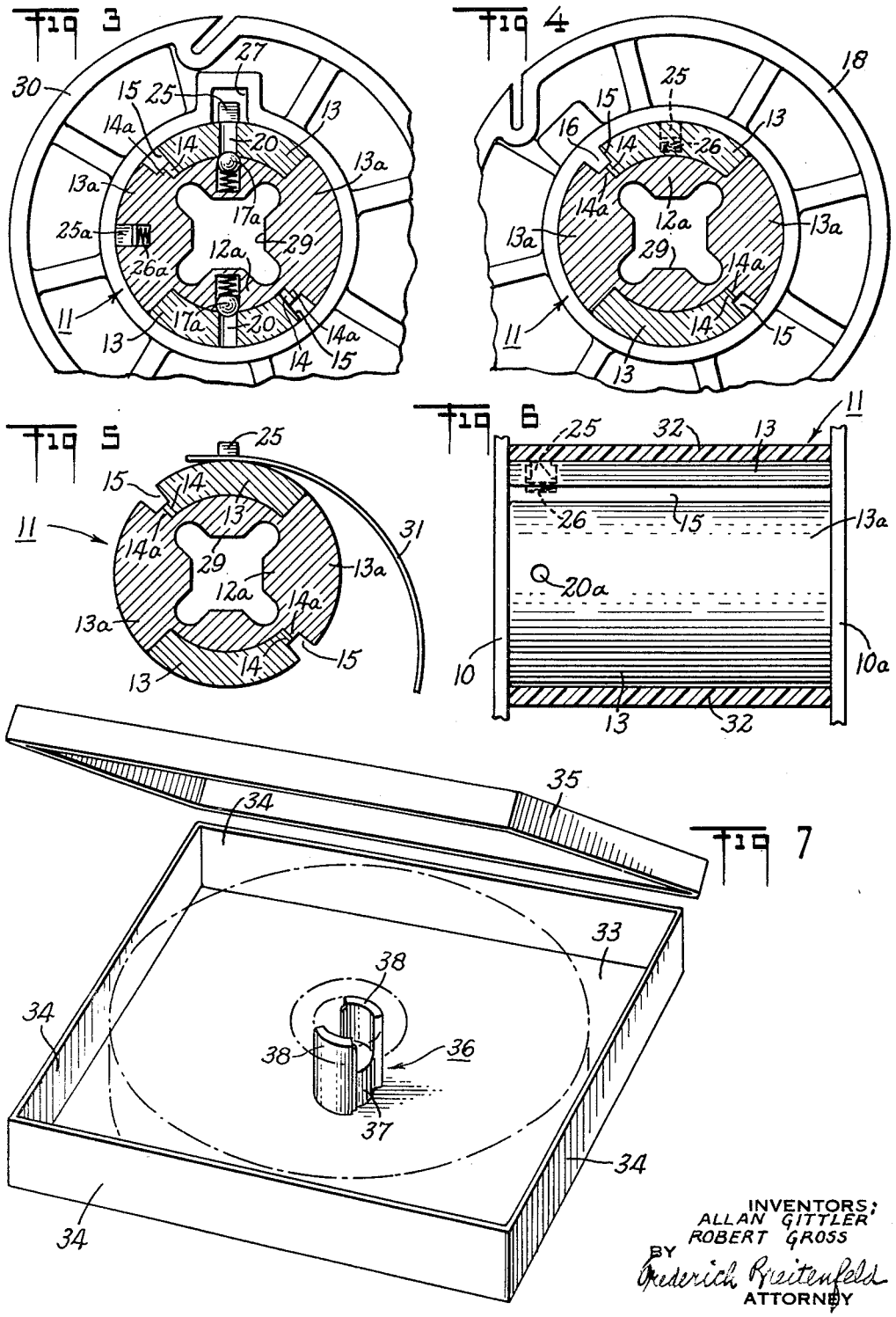

United States Patent Office 3,173,536
Patented Mar. 16, 1965

3,173,536
REEL FOR MOTION PICTURE FILM AND THE LIKE
Allan Gittler, Jamaica, and Robert Gross, Scarsdale, N.Y., assignors to Film Instruments & Accessories, Inc., New York, N.Y., a corporation of New York
Filed Mar. 20, 1963, Ser. No. 266,536
12 Claims. (Cl. 206—52)

This invention relates generally to film- and tape-winding, and has particular reference to reels and flanges.

The invention is of particular utility and value in connection with the winding and rewinding of motion-picture film, but it is to be understood that its applicability and usefulness extends to films and tapes generally. The term "film" as used herein is intended to refer to all kinds of tapes, both photographic and otherwise; and in connection with photographic film it is intended to refer not only to positive and negative "raw stock" but also to processed negatives and prints.

It is a general object of the invention to provide a film-flange of improved design, affording numerous advantages and economies not heretofore attainable. A film-flange is a device comprising a circular disc and a hub projecting perpendicularly from its central region. Film is often wound on such a device.

A more particular object of the invention is to provide a flange which is so constructed that one of its capabilities is to inter-connect with another flange of identical kind to form a complete film-reel, the parts being readily re-separable. Split reels are known in the art, but the parts are not usually identical and freely interchangeable with others, nor are the individual flanges intended for use by themselves.

Because of its wide usefulness in the motion-picture industry, by all who are concerned with film winding and rewinding, film editing, film projecting, and film handling in general, the invention will be described in terms of its applicability to motion-picture film. The photographically sensitive raw stock is customarily wound on plastic cores, of which several types are in common use. All of the cores have the same internal diameter, but, according to the convention of the industry, they differ in that positive raw stock is always wound on cores provided with an interior slot for accommodating a key projecting outwardly from the hub of the flange or reel (in order to produce a driving relationship), whereas negative raw stock is always wound on cores provided with a projecting key or rib adapted to cooperate with a slot in the hub of the flange or reel to produce the driving relationship. When such raw stock is developed or processed to produce negatives or prints, the laboratory usually delivers the processed stock on corresponding "negative" (ribbed) and "positive" (slotted) cores, and sometimes the processed film is wound on "neutral" cores having neither rib nor slot. Frequently it is desirable to wind a length of film directly onto the hub of a flange or reel, without using any core at all.

At the present time there is no commercially available film-flange or film-reel which can selectively accommodate all three types of cores as well as (core-less) "tight-wound" film. It is an object of this invention to satisfy this need, and to provide a flange (and a reel formed of two interfitted flanges) having such "universal" ability. More particularly, it is the aim of the invention to provide a film-flange (and split reel) of the character referred to, having novel structural features which enable it to receive (in driving relationship) not only film-carrying cores of all three types, but also lengths of film not mounted on cores.

A feature of the invention resides in the provision of a film-flange which is so constructed that it permits ready inter-engagement with, or separation from, another flange of identical kind, even while a roll of film is being carried, the film remaining unaffected and unimpaired by this procedure.

Another problem existing in the film-handling industry is that, to safeguard the film, it is usually wound on a reel (and often enclosed within a can) when it is to be packed in shipping and storage containers. The reel (and the can if used) add to the weight of the package, thus increasing handling expenses, and of course the value of the reel (and can) must be included in the price paid for the film. It is another object of this invention to alleviate this problem.

More specifically, it is an object of the invention to provide a shipping and storage container so constructed that no reel or flange or can need be employed for safely packaging the film. The invention provides a special box or package for accommodating wound film in properly supported and protected manner for storage or shipment, the box being provided in a novel manner with a hub element, formed as part of the box, for cooperation with the improved film-flange heretofore mentioned, to facilitate the ready transfer of film from flange to box and vice versa.

Most of the novel features of the improved film-flange relate to the hub element. One of these features resides in making the length of the hub element equal to the width of the particular film with which the flange is to be used, so that it will support the film across its entire width during "tight-winding." Furthermore, the hub element is provided with a spring-biased outwardly projecting detent, adapted to be received by the slot in a "positive" core to produce the necessary driving relationship. This detent is so located that it is also adapted to be received by one of the sprocket holes on a length of film, whereby it serves to anchor the film during the initiation of the "tight-winding" operation. Thus "cinching" of the film, and possible injury thereby, is avoided.

Another feature lies in forming the hub element in such a manner that when two flanges are brought into interfitting engagement to form a complete reel, a slot is formed in the hub, adapted to receive the inwardly projecting rib of "negative" film cores. When such a "negative" film core is applied, the detent hereinbefore mentioned retreats into flush relationship with the hub element and thus does not interfere with the movement of the core onto the hub element. Such retreat of the detent takes place also when a "neutral" core, having neither slot nor a rib, is placed on the hub element.

A general objective of the invention is to provide a film-flange having the characteristics and desirable features referred to, whose manufacture in commercial quantities is entirely practicable, and whose cost is reasonable enough to make it economically feasible for widespread use. The improved box or container is also of a character that lends itself readily to economical manufacture and use.

One way of achieving these objectives and advantages, and such other benefits as may hereinafter appear or be pointed out, is illustrated in the accompanying drawings, in which—

FIG. 1 is a fragmentary perspective view of the improve flange and its associated hub element;

FIG. 1a is a cross sectional view taken on line 1a—1a of FIG. 1;

FIG. 2 is a fragmentary elevational view of the improved reel with a slotted or "positive" core mounted thereon, the core being shown in cross-section;

FIG. 3 is a vertical cross-sectional view taken on line 3—3 of FIG. 2;

FIG. 4 is a view similar to FIG. 3 showing a ribbed or "negative" core mounted on the reel;

FIG. 5 is a view similar to FIG. 3 showing the initial step of "tight-winding" a length of film on the flange or reel;

FIG. 6 is a view similar to FIG. 2 showing a "neutral" core mounted on the hub; and FIG. 7 is a perspective view of the improved shipping and storage container.

In the drawings, two identical film-flanges are shown in interfitted relation to define a reel. It is to be understood however, that many professional film-handling procedures make an entire reel unnecessary and even undesirable, and that the improved film-flange of this invention is a completely usable device by itself. Each individual flange has all the desirable features and capabilities of the assembled reel except for the fact that the reel affords support for the wound film on both of its edges, whereas the single film-flange supports it only along one edge.

Certain reference numerals will be applied to one of the flanges, and the same reference numerals with the letter "a" appended to them will be applied to the identical portions of the other flange.

Referring to FIG. 1, the flange chosen to illustrate this invention comprises a circular disc 10 (only a portion of which is shown in the drawings), and a hub element indicated generally by the reference numeral 11. The hub projects perpendicularly from the center of one face of the disc 10. The hub element 11 comprises a relatively short cylindrical central portion 12 of reduced diameter, and two relatively long fingers 13 circumferentially spaced around the central portion 12. The axial length of each finger 13 is preferably equal to one of the standard widths of motion picture film, i.e., 8, 16, 35 and 70 millimeters, and the length of the central portion 12 is equal to no more than one-half the length of the fingers 13. The fingers 13 are arcuate and each extends through an angle of about 90°. They have curved outer surfaces that are arcs of the same circle. The inside diameter of the fingers 13 is equal to or slightly larger than the outer diameter of the central portion 12 so that the central portion of each hub part will fit between the fingers of the other flange. The outer diameter of the fingers 13 is equal to or slightly smaller than the inner diameter of the cores upon which motion-picture film is wound as hereinbefore described. The two circumferential spacings between the two fingers 13 are each equal to about 90° so that the fingers 13 of one flange will be accommodated between the fingers of the other flange when the two flanges are brought into cooperable engagement.

The central portion 12 is provided with a bore 29 by means of which the reel, or either flange, may be mounted on the spindle of a projector, an editing machine, or a rewinder. The total width of the complete reel is small enough to permit the spindle lock on any of the above pieces of equipment to be set.

Any two flanges can be fitted together, in separable fashion, by interengaging them so that the fingers of one hub element are positioned between the fingers of the other. It follows that the circumferential spacing of each pair of fingers is at least as great as the circumferential extent of each finger.

In order to prevent accidental separation of the reel parts after they have been brought into engagement, each central portion 12 is provided near its base with two oppositely-facing spring-backed balls 17 (FIGS. 1–3), and each finger 13 is provided with a hole 20 near its free end. The balls and holes are so located that when the flanges are brought into engagement, the holes 20 register with the balls 17a and the holes 20a register with the balls 17. Due to the springs behind the balls, the latter are pushed into the holes as shown in FIG. 3. Consequently, in order to separate the reel parts, sufficient force must be applied to cam the balls 17 and 17a inwardly against their respective springs.

To facilitate separation of the flanges, each disc 10 is provided with two openings 21 near, and on opposite sides of, the hub element 11. In addition, a number of openings 22 is provided in each disc farther from the hub element 11 than the openings 21. The portion of the edge 23 of each opening 22 nearest the hub element 11 is bent outwardly through a relatively small angle (see FIG. 1a). As a result, a space is provided, between the bent edge 23 of the opening 22 and the roll of film 24 on the hub, into which the index finger can be inserted so that pressure can be applied to the filmward face of the edge 23. If, at the same time, the thumbs are pressed against the roll of film through the openings 21, it will be seen that a force tending to pull the flanges apart can be readily applied.

One of the fingers 13 of each flange is provided near its base with an outwardly projecting detent 25 backed by a compression spring 26. The face of the detent 25 remote from the disc 10 is beveled or slanting; the face nearer the disc 10 is parallel to the latter. On the other hand, the sides of the detent perpendicular to the disc 10 are almost perpendicular to the finger 13 from which they project. The detent 25 is adapted to be received, in driving relationship, by the slot 27 (see FIG. 3) provided in a core 30 of the type upon which positive motion-picture raw stock or prints are customarily wound. In addition, the detent 25 is adapted to be received by a sprocket hole near the end of a length of film 31 (see FIG. 5), to be "tight-wound" on the reel, in order to anchor the end of the film 31 during the initial steps of winding.

Along one of its longitudinal edges, each of the fingers 13 is reduced in thickness to define a ledge 14 spaced inwardly from the outer surface of the finger. When two flanges are joined, the ledges 14 of one are located adjacent to the ledges 14a (see FIGS. 3–5) of the other, whereby two longitudinal slots 15 are formed in the hub of the resultant reel. Each slot 15 is adapted to accommodate, in driving relationship, the inwardly projecting key or rib 16 (see FIG. 4) presented by a core 18 of the type upon which negative motion-picture raw stock or processed film are customarily wound.

Due to the fact that the detent 25 is spring biased, it offers no obstacle to the mounting on the hub element 11 of a core having no slot for accommodating the detent. Thus, when a negative film core 18 (FIG. 4) or a neutral core 32 (FIG. 6) is slipped onto the hub element, it first contacts the beveled face of the detent 25 and readily cams the detent into flush relationship with the finger 13 from which it projects against the force of the spring 26. Also, of course, even when a positive film core 30 is mounted on the hub, as in FIG. 3, the detent of only one of the flanges, such as the detent 25, will be accommodated by the slot 27 in the core. The other detent, 25a, will retreat into flush relationship with its finger 13a.

It will be seen, therefore, that the invention provides a film-flange capable of receiving negative film cores, positive film cores, neutral cores, and tight-wound film, all in driving relation to the hub on which they are mounted. In this respect alone, the improved film-flange is more versatile than any flange heretofore known. Additionally, it has the capability of interfitting with another flange of identical kind to form a "split reel," the latter then embodying the full core-receiving and tight-winding versatility.

Another important feature of this invention is the provision of a storage and shipping container, cooperable with the improved film-flange described above, for accommodating wound film not mounted on a reel or flange. Referring to FIG. 7, the container shown comprises a bottom wall 33, four side walls 34, and a removable cover 35. Projecting from the center of the bottom wall 33, and perpendicular to the bottom wall, is a hub element 36 similar to the hub element 11 described above. While the hub element 36 is not provided with elements such as the balls 17, holes 20, detent 25, or bore 29, it does have a reduced-diameter central portion 37 and two fingers 38 adapted to cooperately engage the central portion 12 and fingers 13 of one of the flange units hereinbefore described. When a length of wound film is to be transferred from the flange to the container of FIG. 7, the container cover 35 is removed, and the hub element 36 is brought into cooperative engagement with the hub element 11 of the flange upon which the film is mounted. The flange and container are then inverted so that the flange is above the container, and the flange is lifted out leaving the film mounted on the hub element 36. The cover 35 is then placed on the container, and the package is ready for storage or shipment. It should be noted that the height of the box is such, i.e., about equal to the length of the hub fingers, that the film is completely supported, and firmly against displacement, by the hub element 36 and by the bottom wall and cover. Moreover, the film does not rest on any of the side walls 34 of the container. Thus, an undesirable flattening of one side of the roll of film is avoided. To transfer the film from the container to the flange, the steps outlined above are reversed.

The box cover 35 may advantageously be of the sliding type, if desired, to establish a more secure enclosure of the film.

The invention has been shown and described in preferred form only and it is obvious that many changes may be made in the illustrated embodiment which will still be comprised within the spirit of the invention. It is understood, therefore, that the invention is not limited to any specific form or embodiment except insofar as such limitations are set forth in the appended claims.

What is claimed is:

1. A film-flange comprising a circular disc and a hub projecting perpendicularly from the center of said disc, said hub comprising
    a central part provided with a central mounting bore and an outer cylindrical surface concentric with said bore, and
    circumferentially spaced fingers integral with said hub and projecting in the direction of the hub axis, said fingers having inner and outer surfaces,
        the inner surfaces lying along said cylindrical surface,
        the outer surfaces lying along a concentric cylindrical surface of greater diameter,
        said fingers having a length substantially twice that of the central part of the hub, and
        the spaces between the fingers being all of the same circumferential extent and each being substantially the same as the circumferential extent of each finger so that the fingers and central part of said flange can be separably interfitted snugly with those of another identical flange to define a reel.

2. A film flange as defined in claim 1, in which the outer surface of said central part and the inner surfaces of said fingers are provided with cooperable detent means for retaining a pair of interfitted flanges in readily separable engagement.

3. A film-flange as defined in claim 2, in which said detent means comprises a spring-pressed ball on one of the interlocking surfaces and a complementary recess in the other.

4. A film-flange as defined in claim 1, including a recess in the outer surface of one of said fingers closely adjacent to the disc from which said finger projects, and a spring-pressed detent in said recess normally projecting radially from said surface and resiliently depressable into said recess, said detent being adapted to engage with a slot formed on a film core applied to said hub, and being adapted to retreat into said recess when a slotless core is applied to said hub.

5. A film-flange adapted to cooperate with another film-flange to form a complete reel, said flange comprising a circular disc and a hub projecting perpendicularly from one face of said disc, said hub being generally circular in cross-section and having a reduced diameter portion adapted to receive in driving relationship the inwardly projecting key found on negative film cores, and a spring-biased detent projecting outwardly from the larger diameter portion of said hub adapted to be accommodated in driving relationship by the slot found on positive film cores, said detent being movable against the force of said spring into flush relationship with said hub when a core without a slot, such as a negative film core or neutral core, is mounted on said hub.

6. A film-flange according to claim 5 wherein the side of said detent remote from said disc is beveled and the side nearer the disc is parallel to the latter.

7. A film-flange according to claim 5 wherein the length of the larger diameter portion of said hub is substantially equal to the width of the film to be mounted thereon.

8. A film-flange according to claim 5 wherein the length of the larger diameter portion of said hub is substantially equal to the width of the film to be mounted thereon, said detent being spaced from said disc a distance about equal to the distance between the edge of said film and the sprocket holes in said film, and said detent being sized to fit into one of said sprocket holes, whereby a length of film may be wound directly on said hub by positioning the end portion of the length of film against said hub with said detent through a sprocket hole and rotating said hub on its axis.

9. A film-reel for motion picture film or the like, consisting of two separable film-flanges, each flange comprising a circular disc and a hub element projecting perpendicularly from one face of said disc, said hub element comprising two fingers having curved outer surfaces that are arcs of the same circle, said fingers being circumferentially spaced apart a distance substantially equal to the circumferential dimension of said fingers so that the fingers of each flange will interfit with the fingers of the other, at least one of said fingers being provided with a narrow reduced-diameter ledge extending circumferentially toward the other finger so that when said flanges are fitted together with said ledges in abutment a slot is formed by said ledges adapted to receive in driving relationship the inwardly projecting rib found on negative film cores, and a spring-biased detent projecting outwardly from one of said fingers adapted to be accommodated in driving relationship by the slot found on positive film cores, said detent being movable against the force of said spring into flush relationship with the curved outer surface of said finger.

10. In combination, a film-flange adapted for separable interengagement with another similar flange to form a complete reel, said flange comprising a circular disc and a hub projecting perpendicularly from the center of said disc, said hub comprising two circumferentially spaced fingers having curved outer surfaces that are arcs of the same circle, the circumferential spacing of said fingers being at least as great as the circumferential extent of each finger so that the fingers of each flange can be interfitted with the fingers of the other, the fingers having a length substantially equal to the spacing between the opposed discs when the flanges are interengaged, a flat rectangular box having a bottom wall, side walls, and a removable cover, the bottom wall being provided in its medial region with an upstanding hub comprising fingers shaped and sized like, and interfittable with, the fingers on said flange, whereby wound film can be transferred from hub to hub by temporarily interengaging said hubs.

11. The combination defined in claim 10, wherein the height of the box is about equal to the length of said fingers, whereby a wound film mounted on the hub within said box is firmly retained against displacement by the bottom wall and cover.

12. In combination, a film-flange comprising a circular disc and a hub element projecting perpendicularly from one face of said disc, and a shipping and storage container for rolls of film, said container having a bottom wall, side walls, a removable cover, and a hub element projecting perpendicularly into said container from said bottom wall, said hub elements being cooperably engageable so that a roll of film mounted on said flange may be transferred to the hub element in said container and vice versa, each of said hub elements comprising circumferentially spaced fingers, the spaces between them being all of the same circumferential extent and each being at least as great as the circumferential extent of each finger so that the fingers on each of said hub elements can be interfitted with those of the other, said fingers having a length substantially equal to the width of the film to be transferred.

References Cited by the Examiner

UNITED STATES PATENTS

| | | | |
|---|---|---|---|
| 24,653 | 7/59 | Moss | 292—252 |
| 751,345 | 2/04 | Saunders. | |
| 1,392,220 | 9/21 | Quint. | |
| 1,756,003 | 4/30 | North. | |
| 1,829,482 | 10/31 | Hayden | 242—68.3 |
| 2,746,692 | 5/56 | Wijchman | 242—71.8 |
| 2,935,190 | 5/60 | Braun | 206—52 |

MERVIN STEIN, *Primary Examiner.*

DONALD W. PARKER, *Examiner.*